(12) United States Patent
Saebi

(10) Patent No.: US 8,065,028 B1
(45) Date of Patent: Nov. 22, 2011

(54) METHOD OF CONSTRUCTING A COMPOSITE STRUCTURE

(76) Inventor: Nasser Saebi, Glendale, AZ (US)

( * ) Notice: Subject to any disclaimer, the term of this patent is extended or adjusted under 35 U.S.C. 154(b) by 0 days.

(21) Appl. No.: 12/807,956

(22) Filed: Sep. 17, 2010

Related U.S. Application Data

(63) Continuation of application No. 12/150,043, filed on Apr. 24, 2008, now abandoned.

(60) Provisional application No. 60/926,199, filed on Apr. 24, 2007.

(51) Int. Cl.
*G06F 19/00* (2011.01)
*G06F 17/50* (2006.01)
*G06F 7/60* (2006.01)
*G06F 9/455* (2006.01)

(52) U.S. Cl. ............ 700/98; 703/1; 703/2; 703/22

(58) Field of Classification Search ............ 700/98; 703/1, 2, 22
See application file for complete search history.

(56) References Cited

U.S. PATENT DOCUMENTS

| | | | |
|---|---|---|---|
| 6,788,984 B2 * | 9/2004 | Plotkin ............ | 700/97 |
| 7,640,146 B2 * | 12/2009 | Nutwell et al. ............ | 703/2 |

* cited by examiner

*Primary Examiner* — Albert Decady
*Assistant Examiner* — Thomas Stevens
(74) *Attorney, Agent, or Firm* — Albert W Davis, Jr.

(57) ABSTRACT

The invention provides a method for constructing a composite structure by creating a 3-D actual or non-virtual model of the structure or feature, scanning the model into a computer program, importing the model into a Finite Element Analysis (FEA) program, meshing the model, performing a FEA on the model in the FEA program to determine the materials and the dimensions for the materials making up the composite and building the composite structure.

5 Claims, 11 Drawing Sheets

METHOD OF CONSTRUCTING A COMPOSITE STRUCTURE

CROSS-REFERENCE TO RELATED APPLICATIONS

This application is a continuation application of Ser. No. 12/150,043 filed Apr. 24, 2008 now abandoned by Nasser Saebi for Method of Constructing a Composite Structure which claims priority of Ser. No. 60/926,199 filed Apr. 24, 2007 by Nasser Saebi for Method of Constructing a Composite Structure.

The following references are incorporated by reference: U.S. Pat. No. 6,308,490 issued Oct. 30, 2001 and U.S. Pat. No. 6,912,488 issued Jun. 28, 2005 to Nasser Saebi for Method of Constructing Curved Structures as Part of a Habitable Building and U.S. Pat. No. 6,721,684 issued Apr. 13, 2004 and U.S. Pat. No. 6,985,832 issued Jan. 10, 2006 to Nasser Saebi for Method of Manufacturing and Analyzing a Composite Building.

BRIEF DESCRIPTION OF THE INVENTION

The invention provides a method for constructing a composite structure by creating a 3-D actual or non-virtual model of the structure, scanning the model into a computer program, meshing the model as disclosed in U.S. Pat. No. 6,721,684, importing the model into a Finite Element Analysis (FEA) program, performing a FEA on the model in the FEA program to determine the materials and the dimensions for the materials making up the composite, and building the composite structure.

In this invention, a solid polyurethane model has been made. For example, the scale of the model is 1:24. The model is scanned to create a similar CAD model in a computer and enlarged to the actual dimensions. The CAD model is exported to a Finite Element Analysis (FEA) program. In the FEA program, the model is surface meshed. Then, the model is again surface meshed to create the coating and is solid meshed tp create the core of solid mesh or discrete volumes.

In the FEA, program various loadings can be run on the computer model to predict the results or effects of the loads in a similar composite structure. The mechanical properties of the materials of the building and their dimensions are fed into the FEA program before the analysis.

The materials that can be used to build the display are a FRC (Fiber Reinforced Coating), such as Glass Fiber Reinforced Concrete (GFRC) which coats plastic foam, such as Expanded PolyStyrene (EPS). The Fiber Reinforced Coating (FRC) coats the surfaces of the foam core and can be other materials than GFRC.

BRIEF DESCRIPTION OF THE DRAWINGS

FIGS. 1-13 are perspective views of the invention.

DETAILED DESCRIPTION OF THE INVENTION

Figure 1:
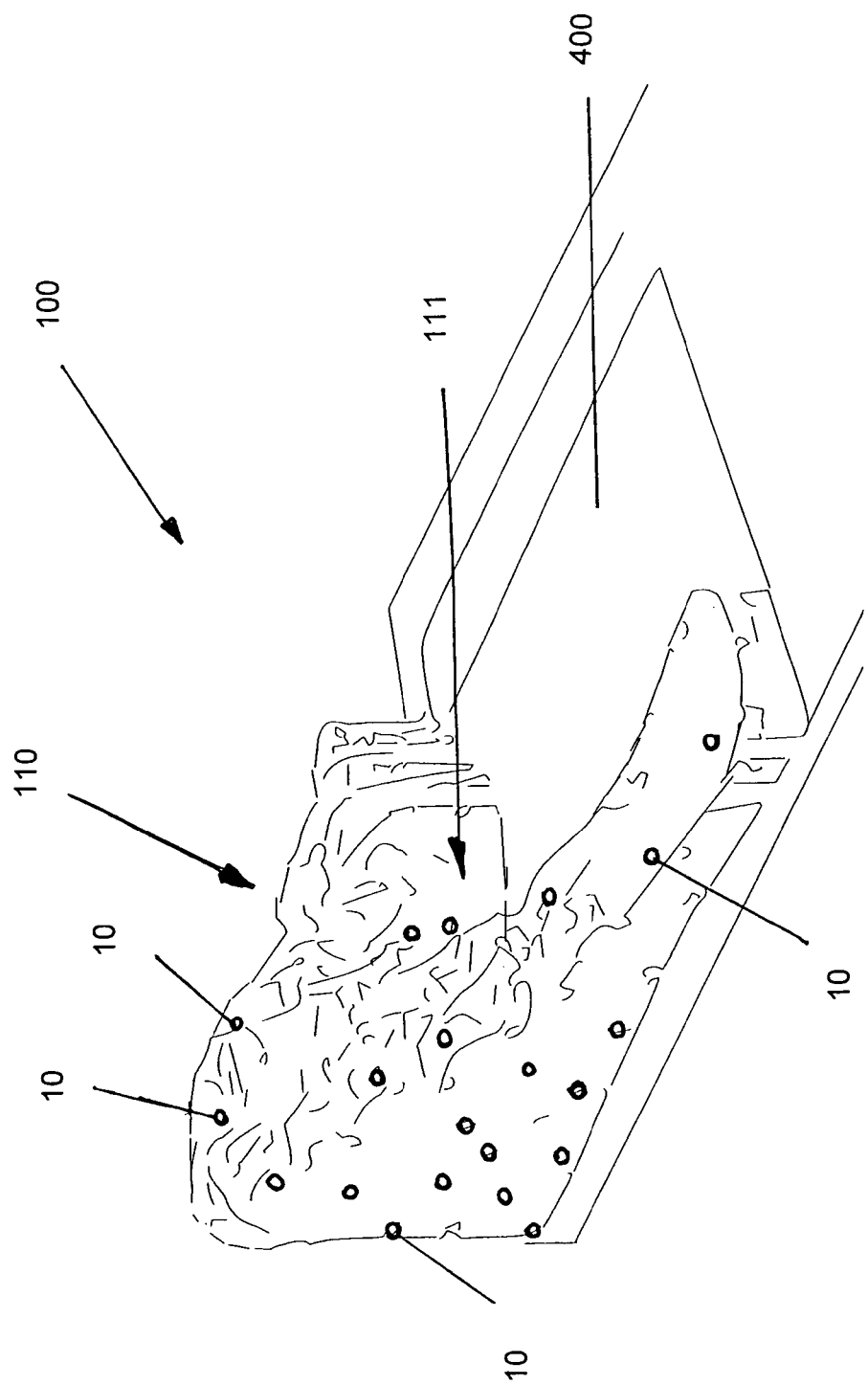

FIG. 1 shows a 3-D actual model 100 of a display or feature that is to be constructed in a museum. The display or feature has several pieces, one of which is back portion 110 which is to be a granite mountain with a passage 111 for people to walk through. For example, the granite mountain will be 19.5 feet high with a maximum width 38 feet at the base.

The model portion 110 is shown supported on a table or other support surface 400.

The model 100 can be created out of modeling clay, plastic foam or other material. Round markers 10 are added by adhesive to the model. Not all of the markers 10 are shown.

Figure 2:
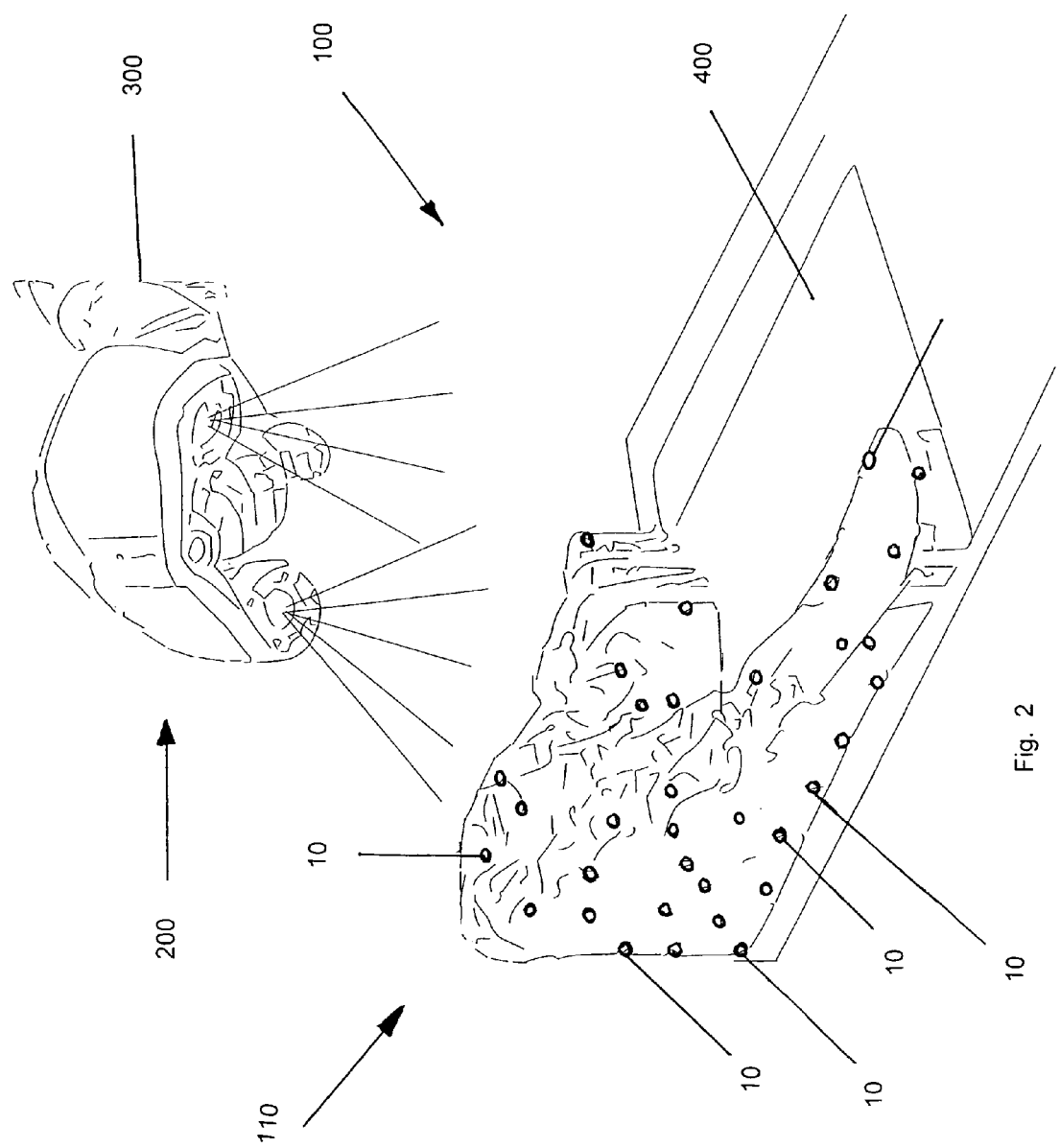

FIG. 2 shows the scanning of part of the model. The back portion 110 of the model of the display is scanned by using a hand held scanner 200, such as HANDYSCAN 3D™ (now known as REVscan™) held by hand 300. More information on the scanner is available from the Creaform 3D Company.

Other portions of the model 100 of the display have been removed for the scanning process.

Figure 3:
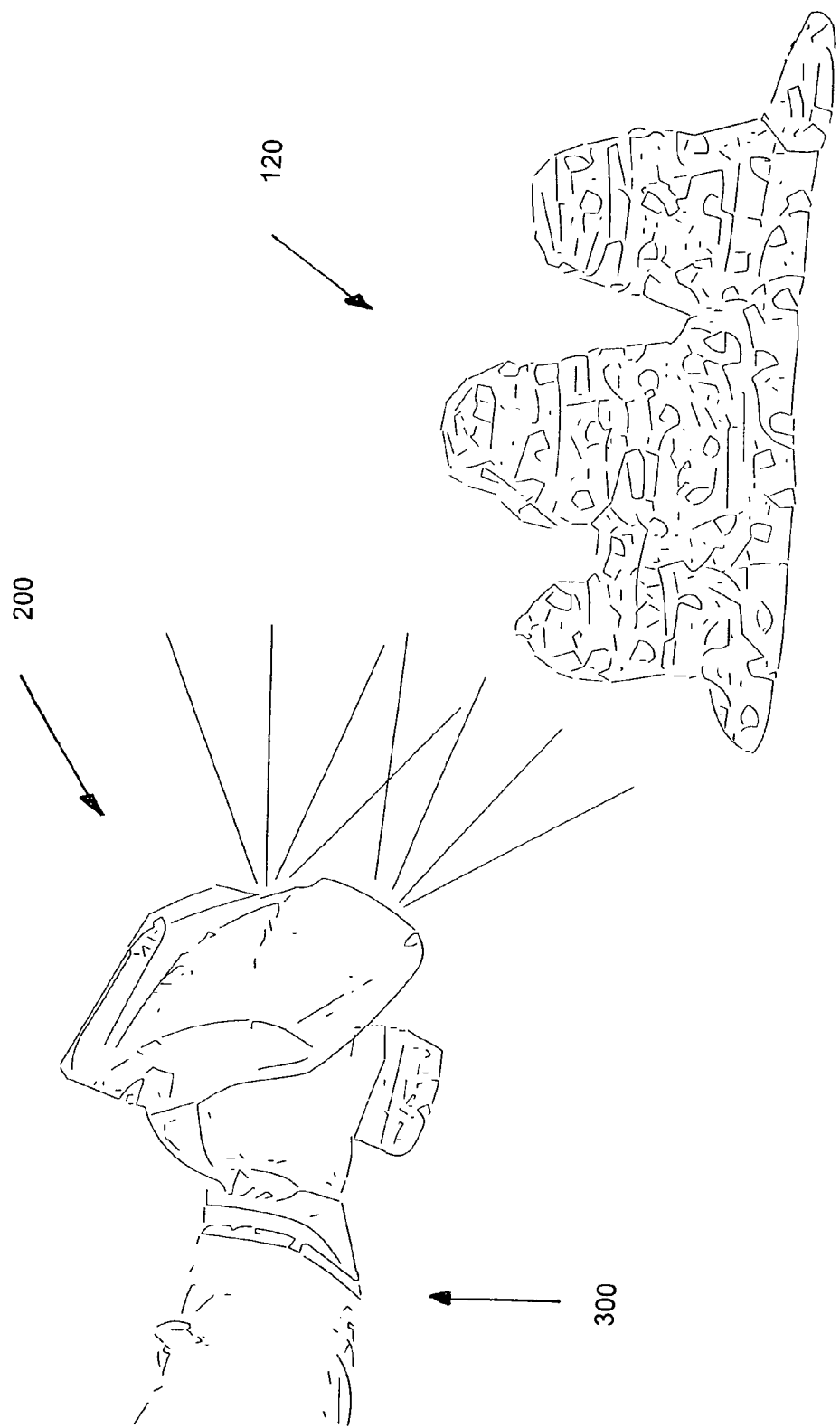
Figure 4:
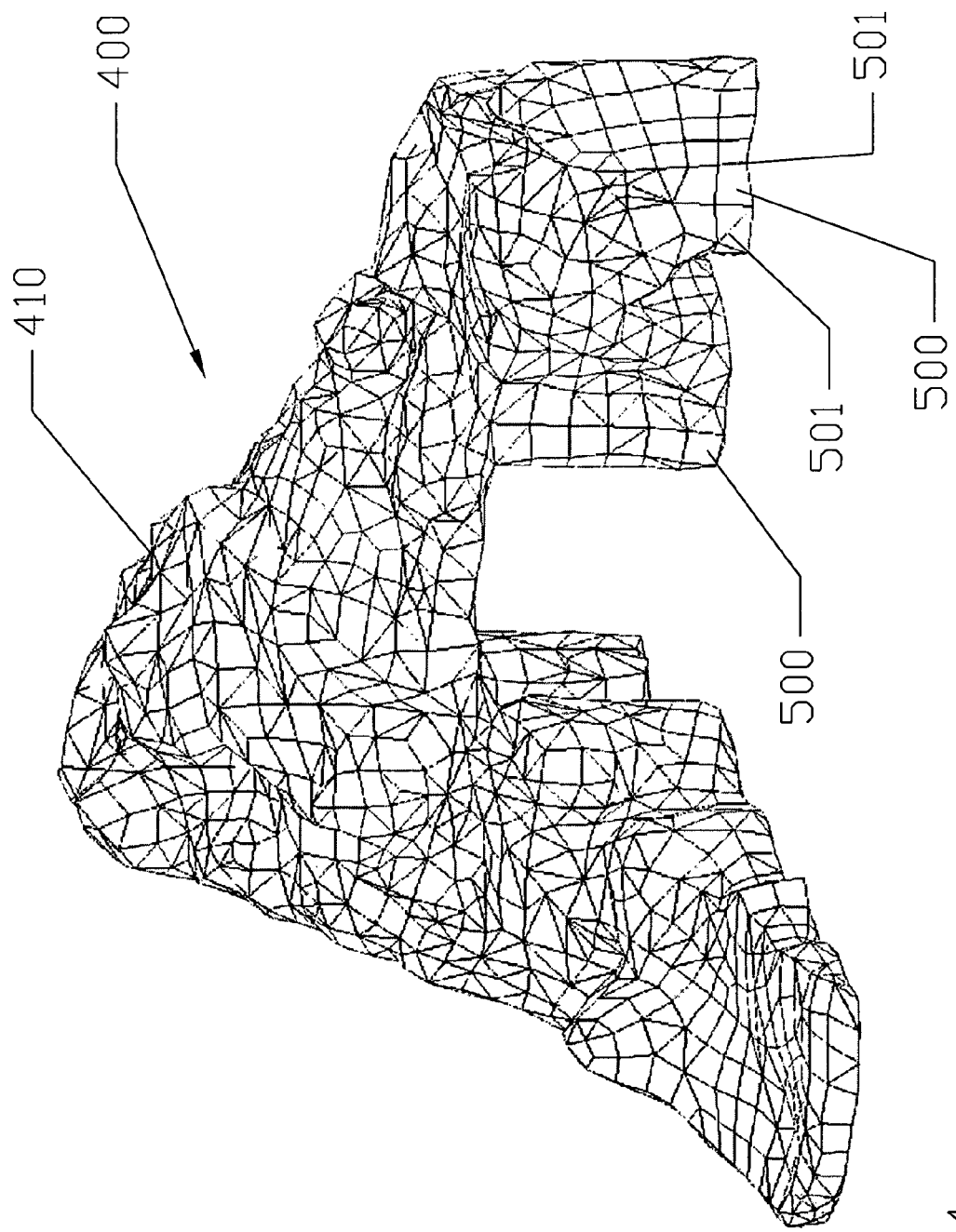

FIG. 3 shows another portion of the model being scanned, front portion 120 of the model 100. Portion 120 is a sandstone range and will be 16 feet high, 35 feet long and 6 feet wide at the base.

The size or dimensions of the markers 10 is constant and known. Therefore, the dimensions of the display 100 can be computed by the scanning software/program, and a model is built in the computer.

During the scanning, the back portion 110 of the model and other portions of the model are picked-up and the bottom surface and inner surfaces of the portions are scanned. All of the surfaces to be scanned are provided with markers 10.

The information from the scanning is fed into the software/program in the computer, such as XVScan™ for the HANDYSCAN 3D (REVscan) scanner. The data is used to create a solid 3-D model 400 in the computer.

The 3-D computer model 400 is then exported to a Finite Element Analysis (FEA) program such as ALGOR FINITE ELEMENT™. The FEA program is used to mesh the computer model 400.

Using the teachings of our U.S. Pat. No. 6,721,684, the model is subjected to a FEA using the following steps:

The model is surface meshed.

The model is solid meshed to create solid mesh or bricks in the FEA program.

A coating mesh is added to the model on its inner and outer surfaces.

Then, the solid mesh and the coating mesh on the inner and outer surface of the model are assigned the values of strength, thickness, etc. related to the mechanical properties of the materials that are to be used in building the display. The core or solid mesh is plastic foam, such as EPS, and the coatings or surface mesh are Fiber Reinforced Coatings, FRC, such as GFRC.

Then, the model is subjected to FEA using various loading schemes.

FIGS. 4-7 show the back portion 410 of the meshed model in the FEA program from several angles. The computer generated meshed back portion 410 of the display has a passage 411 and a base 412. The meshing divided the model 410 into discrete volumes or "bricks" 500 delineated by the mesh lines 501.

Figure 5:
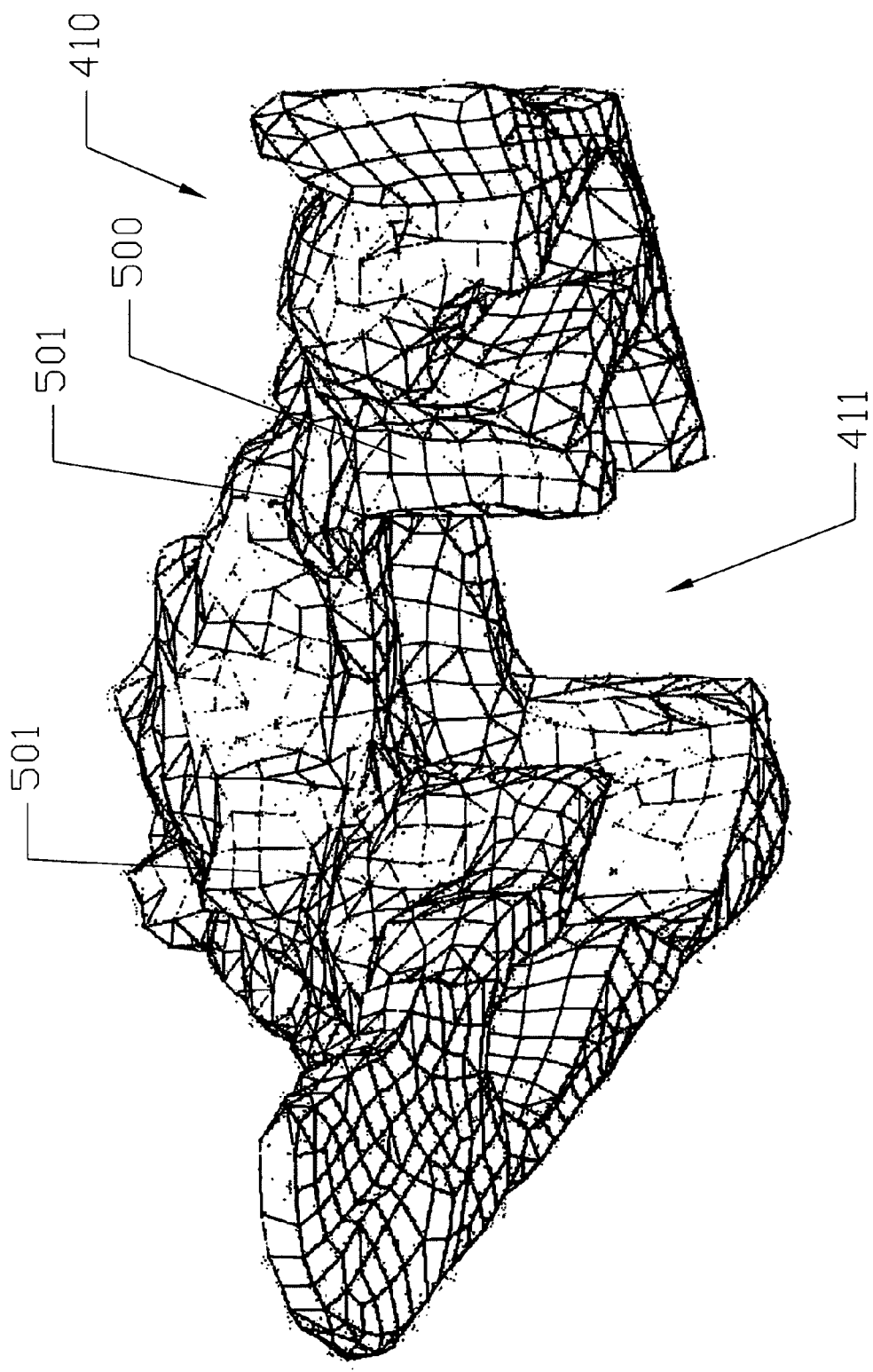

FIG. 5 shows the back portion 410 from a bottom view.

Figure 6:
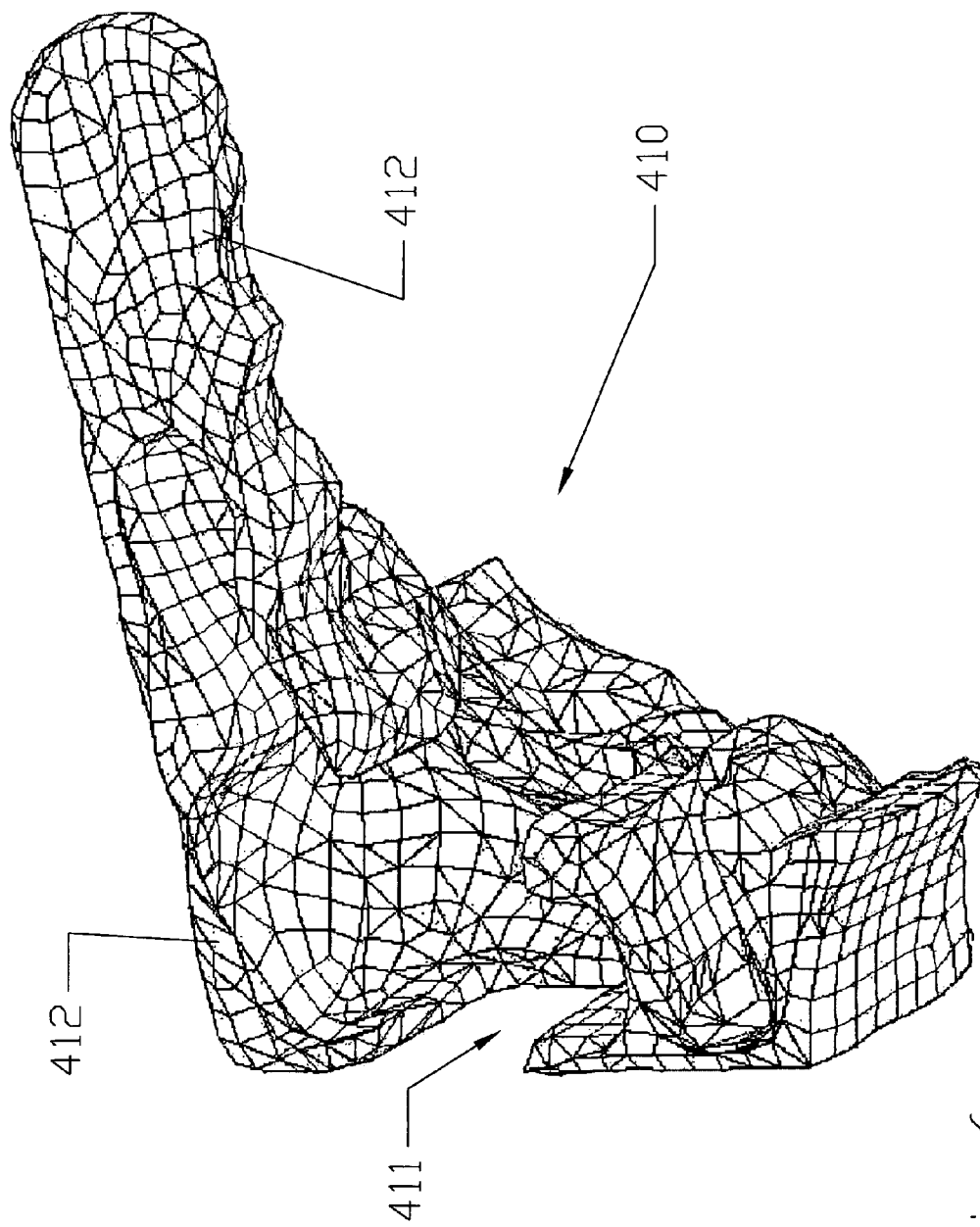

FIG. 6 shows the back portion 410 with the model flipped over, that is bottom surface upward.

Figure 7:
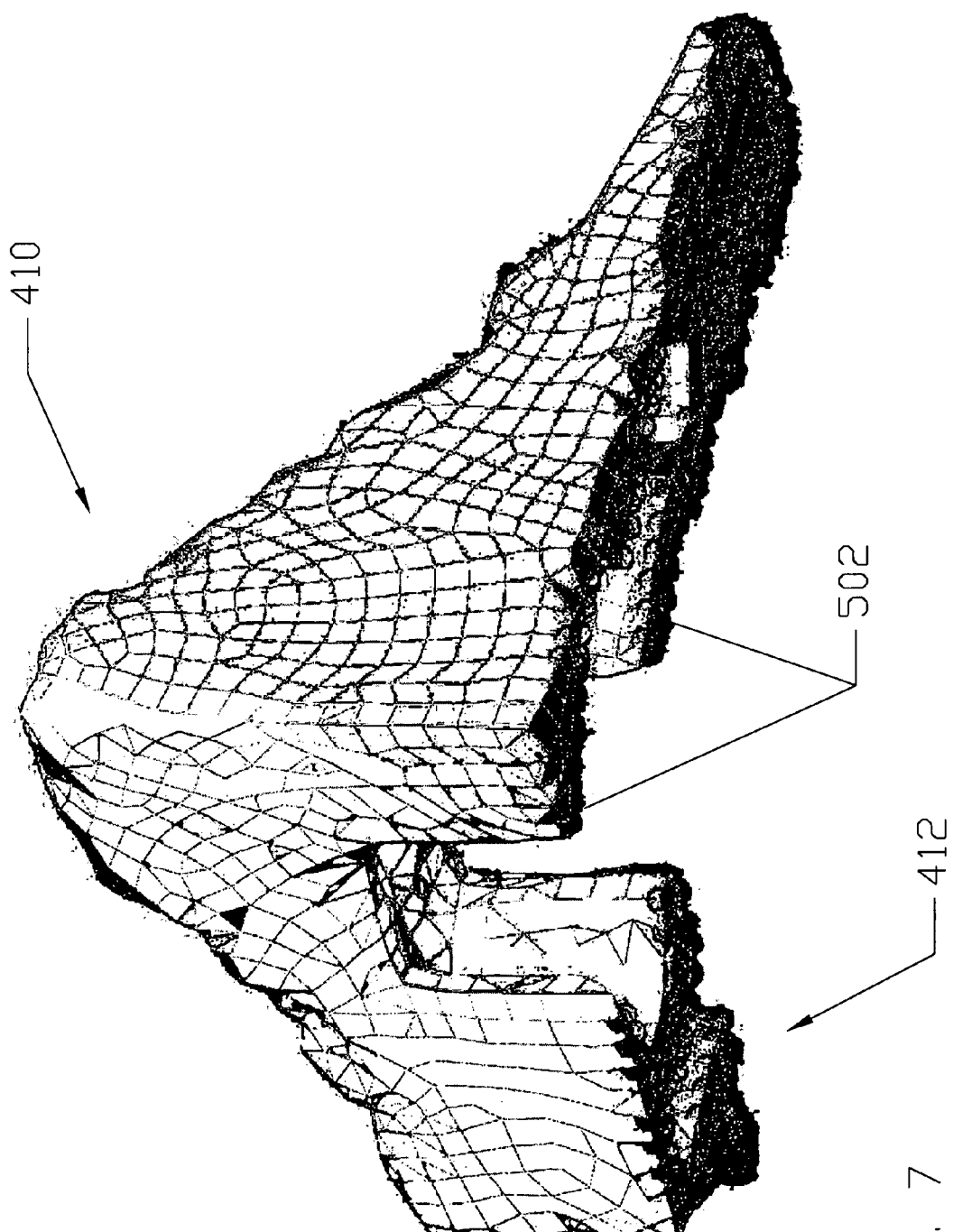

FIG. 7 shows the meshed model 410 of the back portion with the circles or bubbles 502 on the base 412 indicating the fixed nodes in the FEA. A node is a meeting of two or more mesh lines 501.

Figure 8:
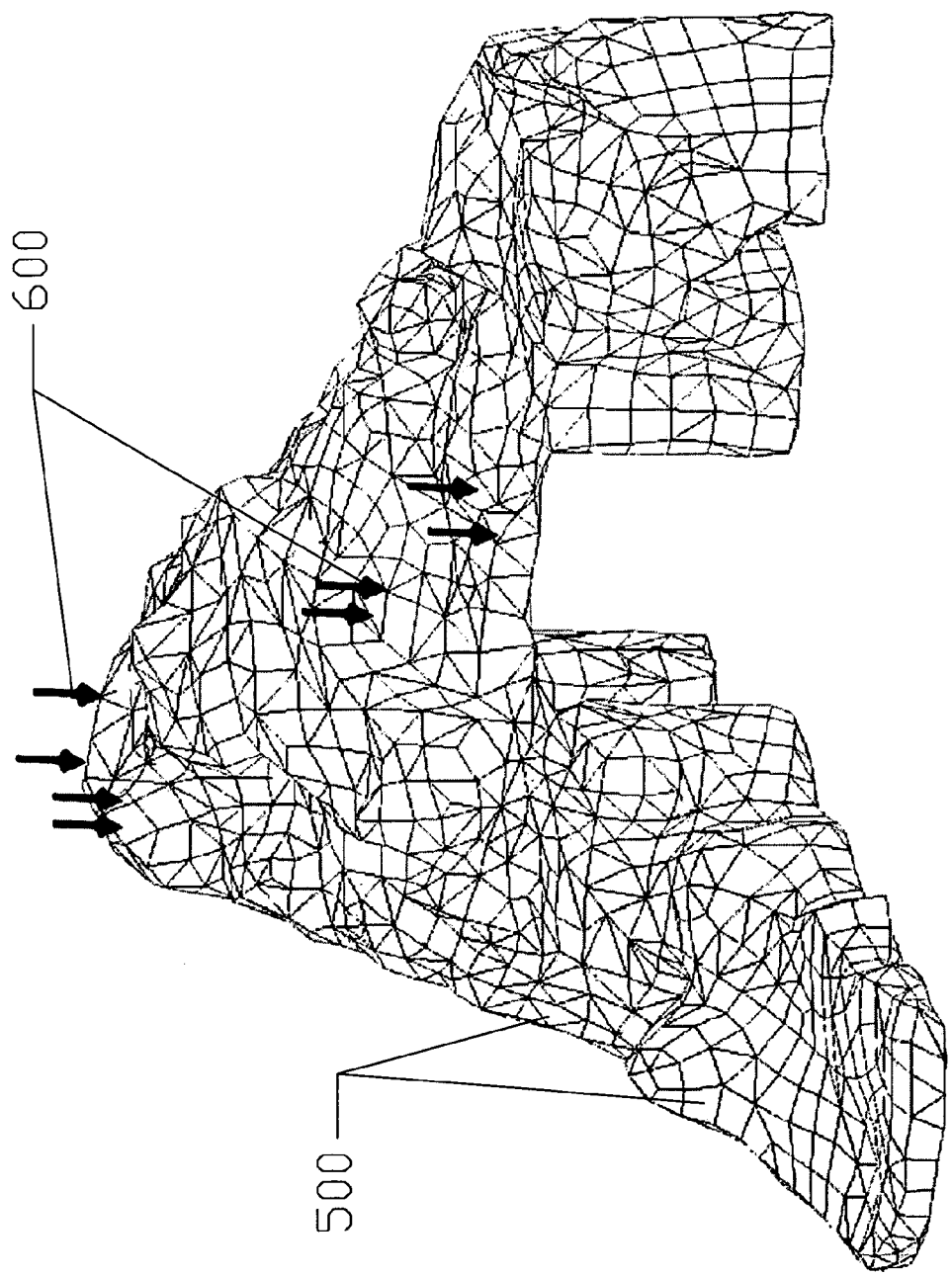

FIG. 8 shows spot loads indicated by arrows 600 which indicating the loading of eight workers at 300 pounds per worker on the display portion.

Figure 9:
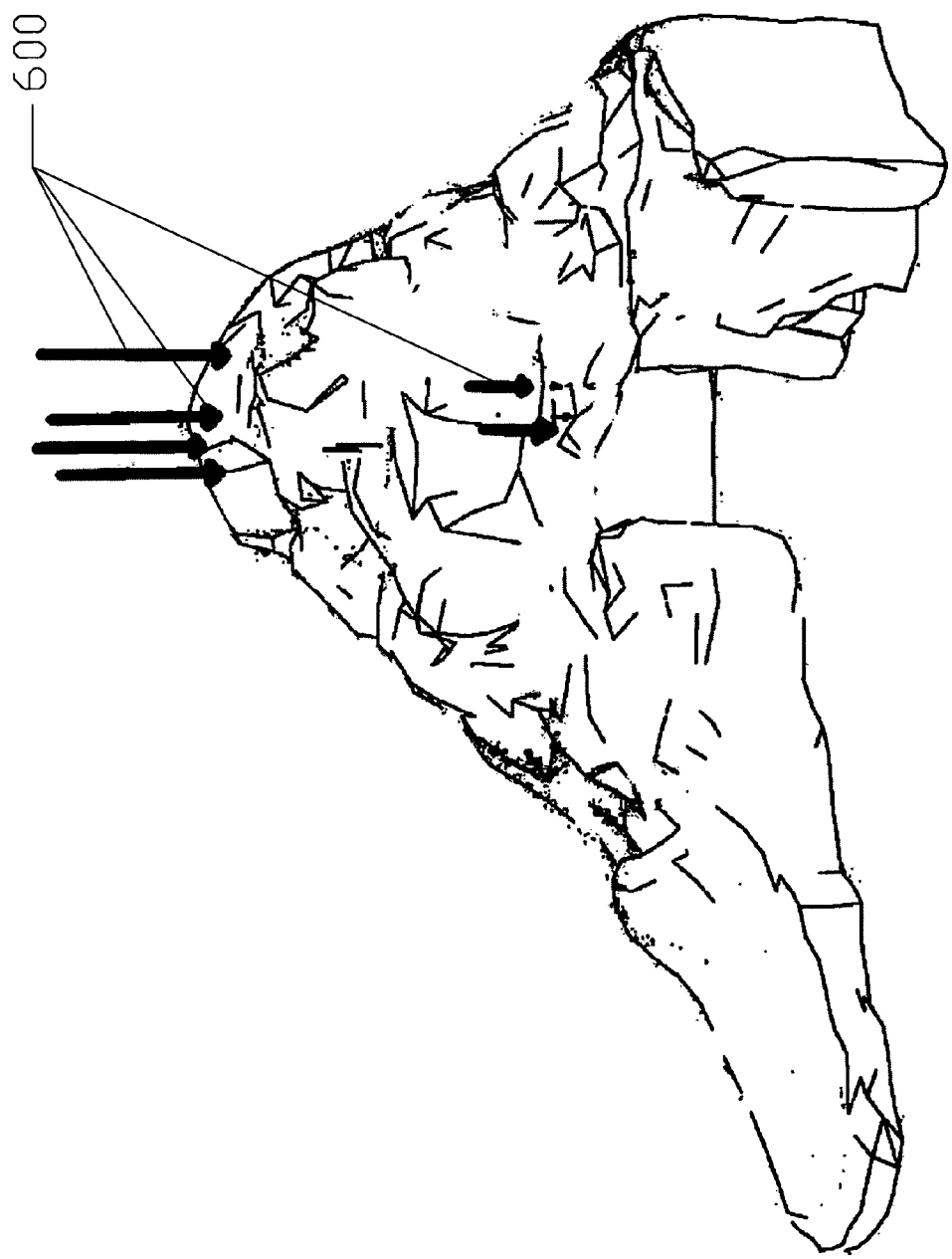

FIG. 9 shows the results of a FEA on the shell or coating only in stress and displacement. The loading was the dead load and eight men at 300 pounds per man.

Figure 10:
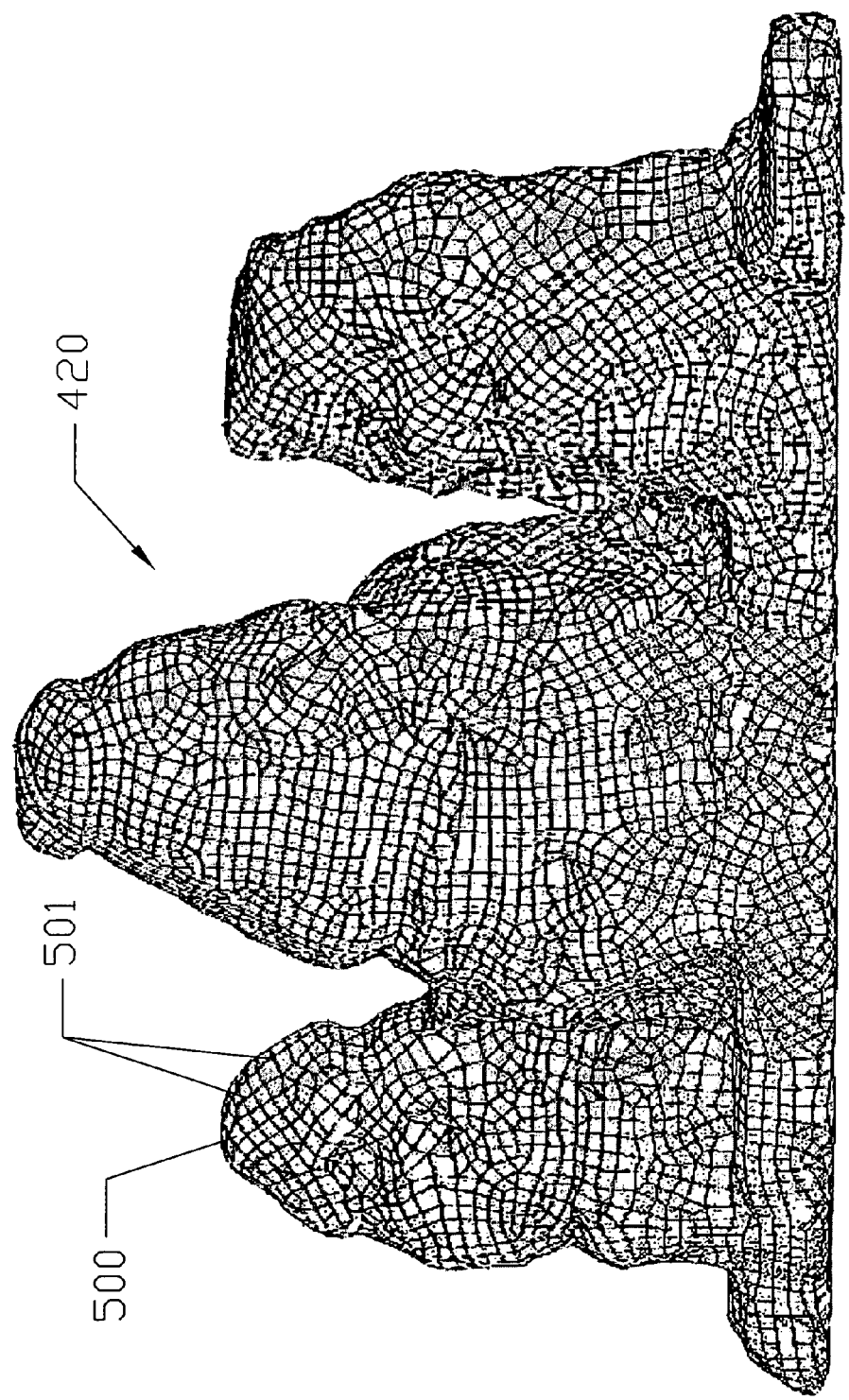

FIG. 10 shows the front portion 420 of the meshed model 400 in the FEA program.

Figure 11:
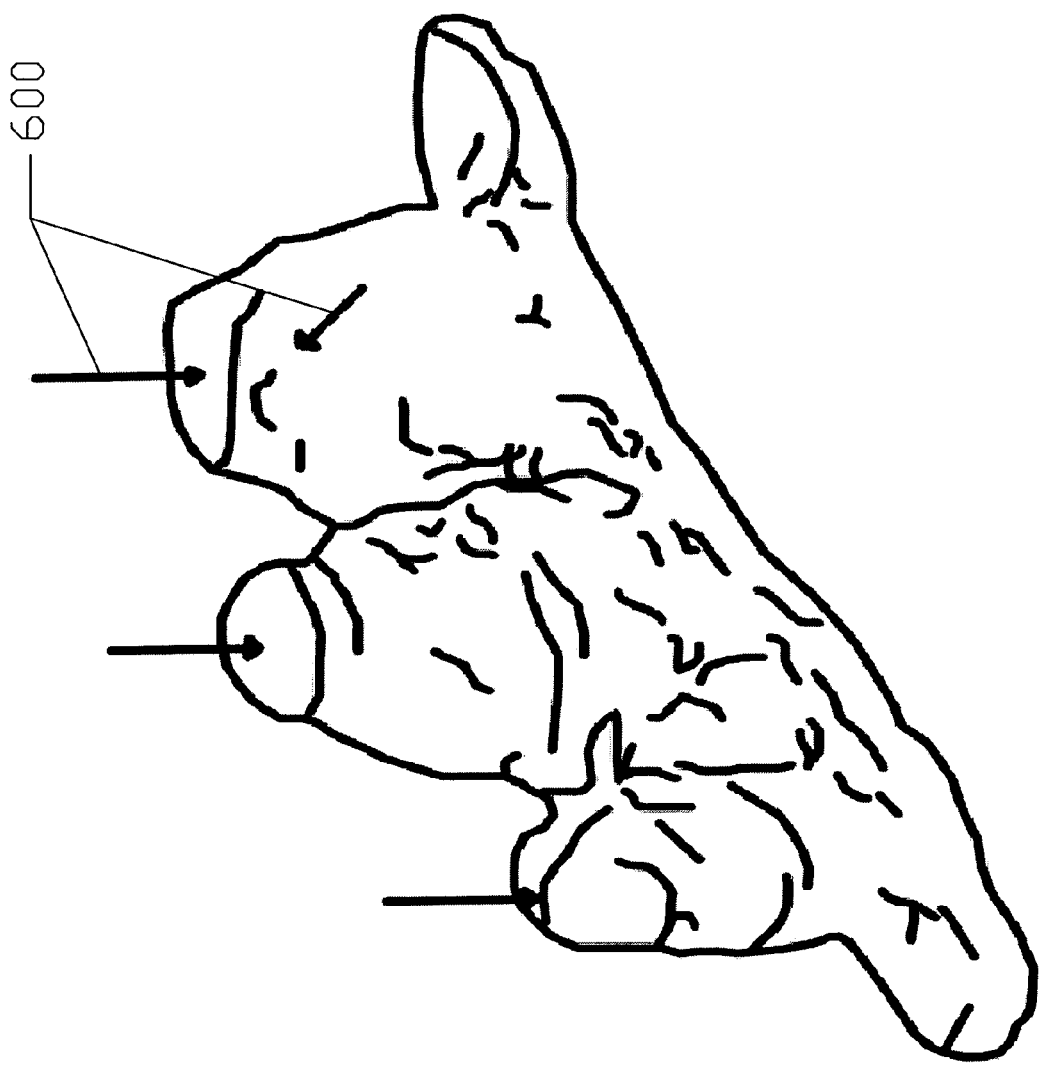

FIGS. 11 and 12 show the results of a FEA on the shell and core combined in displacement in the x and z directions, respectively. The loading as indicated by arrows 600 is 1,000 pounds at each peak and 300 pounds horizontally on each top side of the peaks (representing ladder loads).

FIG. 13 shows the results of a FEA on the shell and core combined in displacement in the x direction of another portion of the display, the small sandstone mountain 430. The loading as indicated by arrows 600 is four men at 300 pounds each at each peak and 300 pounds horizontally on each top side of the peaks (representing ladder loads).

Once the FEA proves that the design will handle the required loading, the structure can be permitted by the building certification authorities. That is, the materials and the dimensions of the materials for the composite to meet the required building standards for the geographic area of the display have been selected from the results of the FEA.

Then, the construction can begin. The foam can be cut into slabs, such as pieces 4 feet×8 feet×31 inches.

These slabs can then be cut using a robotic cutter to form the inner and outer surfaces in the plastic foam. Such a robotic cutter can be FROGMILL™4$^{th}$ Axis CNC Foam Router made by STREAMLINE AUTOMATION.

The cut slabs are bonded together using a suitable bonding agent. The resulting structure is coated on all exposed surfaces with a strengthening coating such as, a FRC, such as GFRC.

The structure can then be painted or otherwise ornamented.

Various changes and modifications to the embodiments herein chosen for purposes of illustration will readily occur to those skilled in the art.

The FRC can be a Glass Fiber Reinforced Concrete (GFRC). a Fiber Reinforced Polymer (FRP) or a Glass Fiber Reinforced Gypsum (GFRG). The fibers can be plastic, glass, carbon, single-wall carbon nanotubes (SWNTs or Buckytubes), Aramid or other fibers. The Polymer can be Epoxies, Polyesters, Vinlyesters or other materials.

The coating also can be without fibers if the design loading is low enough. For the strongest structure, fibers should be added to the coating. The number of coats of the coating and the composition of those coats can be varied.

Bonding agents that bond foam to foam, foam to concrete and concrete to concrete can be structural or non-structural as certified by International Code Council (ICC).

One structural bonding agent is Glass Fiber Reinforced Concrete (GFRC). A thickness of 0.25-0.50 inches is suitable.

A formula for GFRC is:
1 bag of cement (Portland Cement Type III)—94 pounds,
No. 30 silica sand—100 pounds,
water and ice—25 pounds,
polymer (Forton™ VF-774)—12 pounds,
retarder (Daratard™ 17)—2-5 ounces,
plasticizer (Daracem™ 19)—2-6 ounces,
0.5 inch glass fibers (Cem-FIL™ or Nippon AR™)—1.5 pounds and
1.5 inch glass fibers—1.5 pounds.

Another structural bonding agent can be Glass Fiber Reinforced Gypsum (GFRG) which can be purchased from the US Gypsum Company under the brand name Hydrocal® FGR—115 gypsum cement. Glass fibers can be added to the mix to form the GFRG. The GFRG coating can have a flexural strength of 3,200-4,000 psi.

A non-structural bonding agent can be expansive plastic foams, such as Expansive PolyUrethane (EPU), etc. These can be used where the joint strength need not be structural, such as a joint that is later covered with FRC to create structural strength.

The type of plastic foam can be different from Expanded PolyStyrene (EPS). The EPS can have a density of 1.5 pounds per cu. ft. (nominal) which is actually 1.35 pounds per cu. ft. (actual). EPS was used because a Finite Element Analysis was done using EPS and GFRC. Suitable plastic foam could be PU, EPS, etc.

The specific materials used to build the structure may be varied, such as the type of plastic foam, the bonding agents, the coatings, etc.

I claim:

1. A method of constructing a display from composite materials, the composite materials being a plastic foam and a strengthening coating, comprising the following steps,
    creating a 3-D non-virtual model of the display to scale and smaller than the display,
    scanning the 3-D non-virtual model using a scanner, feeding information from the scanning into a program in a computer,
    creating a computer model of the display having surfaces in the program from the scanning information,
    creating a meshed model by surface meshing the computer model in a meshing program,
    solid meshing the computer model in a solid meshing program to create a meshed core of the computer model,
    adding a coating mesh to the surfaces of the meshed core,
    running a Finite Element Analysis or FEA on the meshed model in a FEA program, the FEA providing results from the analysis,
    selecting composite materials and dimensions of the composite materials to meet required building standards for a geographic location of the display from results of the FEA,
    creating the display from the composite materials and the dimensions found from the FEA by using a robotic forming system to form a surface of the display in plastic foam,
    coating the surface of the display with a strengthening coating,
    cutting the display surface from blocks of plastic foam and bonding the blocks of plastic foam together.

2. The method of claim 1 including the following step, selecting a Fiber Reinforced Coating as the strengthening coating.

3. The method of claim 1 including the following step, selecting a scale for the model of at least 1 to 10.

4. The method of claim 1 including the following step, selecting a mountain portion as the model of the display.

5. The method of claim 1 including the following step, making the model at least partly hollow.

* * * * *